United States Patent
Garot et al.

(10) Patent No.: US 10,190,314 B2
(45) Date of Patent: Jan. 29, 2019

(54) ANCHORING ASSEMBLY FOR ANCHORING A LINER OF A CURED LINING MATERIAL, A FERRULE SUITABLE FOR USE WITH THE ANCHORING ASSEMBLY, AN ANCHORING MOUNTING ASSEMBLY FURTHER COMPRISING A FERRULE HOLDER AND THE USE OF THE ANCHORING ASSEMBLY

(71) Applicant: Silicon Holding B.V., Wateringen (NL)

(72) Inventors: Jerome Michael Garot, Wateringen (NL); Danielle Francesca Garot, Wateringen (NL); Wouter Garot, Wateringen (NL)

(73) Assignee: SILICON HOLDING B.V., Wateringen (NL)

( * ) Notice: Subject to any disclaimer, the term of this patent is extended or adjusted under 35 U.S.C. 154(b) by 539 days.

(21) Appl. No.: 14/823,314

(22) Filed: Aug. 11, 2015

(65) Prior Publication Data
US 2016/0047124 A1  Feb. 18, 2016

(30) Foreign Application Priority Data

Aug. 13, 2014 (NL) ...................................... 2013327
May 18, 2015 (NL) ...................................... 2014812

(51) Int. Cl.
*E04C 5/16* (2006.01)
*F16B 37/06* (2006.01)
(Continued)

(52) U.S. Cl.
CPC ............ *E04C 5/162* (2013.01); *B23K 1/0008* (2013.01); *B23K 9/201* (2013.01); *B23K 9/207* (2013.01);
(Continued)

(58) Field of Classification Search
CPC ........ E04B 1/41; E04B 1/4114; E04B 1/4121; E04B 1/4142; E04B 1/415; E04B 1/4178; E04B 2001/4192; F27D 1/141; F27D 1/14
See application file for complete search history.

(56) References Cited

U.S. PATENT DOCUMENTS 1,264,189 A * 4/1918 Keator .................... E04D 1/22
                                                    403/24
2,821,618 A * 1/1958 Haynes ................... B23K 9/20
                                                    219/98
(Continued)

FOREIGN PATENT DOCUMENTS

DE   2011506 A1 * 9/1971 ............... F27D 1/14
JP    61095782      5/1986
JP    01122672      6/1987

*Primary Examiner* — Jonathan P Masinick
(74) *Attorney, Agent, or Firm* — Shumaker, Loop & Kendrick, LLP

(57) ABSTRACT

An anchoring assembly for anchoring a liner of a cured lining material arranged to be applied in liquid form to a metal object provided with the anchoring assembly, the anchoring assembly including an elongated mounting pin and a ferrule provided at a first end thereof, wherein the pin is arranged to be mounted at the first end to the metal object, the anchoring assembly further including a plurality of spaced anchor fins connected to the pin at a second end and extending radially outward relative to the pin, wherein the ferrule includes a radially outwardly extending place holder part arranged to be held by a ferrule holder during mounting of the pin at the first end to the metal object.

8 Claims, 6 Drawing Sheets

(51) Int. Cl.
*B23K 1/00* (2006.01)
*B23K 9/20* (2006.01)
*B23K 11/00* (2006.01)
*B23K 31/02* (2006.01)
*B23K 101/20* (2006.01)

(52) U.S. Cl.
CPC .......... *B23K 9/208* (2013.01); *B23K 11/0046* (2013.01); *B23K 31/02* (2013.01); *B23K 2101/20* (2018.08); *F16B 37/061* (2013.01)

(56) References Cited

U.S. PATENT DOCUMENTS

| | | | | |
|---|---|---|---|---|
| 4,954,402 | A * | 9/1990 | Houston | E04F 13/06 428/597 |
| 6,393,789 | B1 * | 5/2002 | Lanclos | B04C 5/085 110/338 |
| 7,296,382 | B2 * | 11/2007 | Sack | E04B 1/4121 294/89 |
| 8,132,389 | B2 * | 3/2012 | Gee | B28B 23/005 52/699 |
| 8,381,482 | B2 * | 2/2013 | Lin | E04B 1/4157 52/295 |
| 8,555,596 | B2 * | 10/2013 | Hohmann, Jr. | E04B 1/4178 52/379 |
| 9,010,064 | B1 * | 4/2015 | Farahmandpour | E04B 1/7616 52/714 |
| 9,151,038 | B2 * | 10/2015 | Zimmerman | E04B 1/4121 |
| 9,279,245 | B2 * | 3/2016 | Garot | E04B 1/4121 |
| 2006/0016140 | A1 * | 1/2006 | Smith | E02D 27/02 52/295 |
| 2013/0067849 | A1 * | 3/2013 | Espinosa | E04B 1/4121 52/699 |

* cited by examiner

ANCHORING ASSEMBLY FOR ANCHORING A LINER OF A CURED LINING MATERIAL, A FERRULE SUITABLE FOR USE WITH THE ANCHORING ASSEMBLY, AN ANCHORING MOUNTING ASSEMBLY FURTHER COMPRISING A FERRULE HOLDER AND THE USE OF THE ANCHORING ASSEMBLY

CROSS-REFERENCE TO RELATED APPLICATION

This application claims priority from Dutch patent application no. 2013327 filed Aug. 13, 2014 and Dutch patent application no. 2014812 filed May 18, 2015, the contents of which are incorporated by reference herein.

TECHNICAL FIELD AND BACKGROUND

The present invention generally relates to an anchoring assembly for anchoring a liner of a cured lining material applied in liquid form to a metal object provided with the anchoring assembly, and more specifically relates to an anchoring assembly for anchoring concrete linings.

Two categories of anchoring assemblies can be distinguished, those that are mounted on a metal object before lining material in liquid form is applied, and those that are pre-installed in cured lining material. Both categories comprise a variety of different types of anchor assemblies, all of which transfer loads from the anchor assembly to the cured lining material in a variety of ways, which at least depends on the actual design of the anchor assemblies.

The above-mentioned loads are considered to be either static or dynamic. Static loads comprise, for example, tension, shear, or a combination of both. Dynamic loads on the other hand comprise, for example, seismic, fatigue, wind and/or shock. The design of an anchor assembly determines whether it is suitable or unsuitable for the above mentioned load types.

Several techniques are known in the art to transfer the load, such as keying, friction and bonding techniques. Keying, for example, is considered to be the direct transfer of a load from the anchor assembly into the cured lining material by bearing forces in a same direction of loading the anchor assembly.

Friction is based on transferring a load through friction between expansion sleeves of the anchor assembly and the wall of the drilled hole in the concrete. The effect is similar as is reached by a standard plug in a wall. Finally, bonding takes place when resins or grouts are used around the anchor, which is usually the case with post-installed anchor assemblies.

The present invention is related to an anchoring assembly which is or is to be provided on a metal object before the lining material in liquid form is applied.

A known anchoring assembly comprises hex metal, which is to be hand welded to the metal object before the lining material in liquid form is applied to the metal object.

Another known anchoring assembly for anchoring a liner of a cured lining material applied in liquid form to a metal object provided with the anchoring assembly comprises an elongated mounting pin, which elongated mounting pin is arranged to be mounted, at a first end, to the metal object, and a nut having a plurality of spaced anchor fins welded or soldered to the nut, wherein the nut is connected to the elongated mounting pin at a second end and extend radially outwardly with respect to the elongated mounting pin.

In another example, the nut having the plurality of spaced anchor fins is casted using a mold or die or the like.

First, the elongated mounting pin is welded to the metal object. The elongated mounting pin comprises a ferrule, at the first end, for holding any welding residual at his place during the welding process. Once the elongated mounting pin is securely mounted to the metal object, the nut may be screwed at the second end of the elongated mounting pin. In order to provide for a more permanent connection between the nut and the mounting pin, the nut may further, once it is screwed on the mounting pin, be spot welded, hand welded, notched into place, glued or any other similar fashion, to the mounting pin.

A drawback of the known anchoring assemblies is that it is time consuming to mount an anchoring assembly on the metal object. In order to mount an anchoring assembly on the metal object, different time consuming steps need to be performed to make sure that the mounting is successful. These steps are directed to the welding of the elongated mounting pin to the metal object, and, subsequently, screwing the nut having the spaced anchor fins, on top of the elongated mounting pin, at its second end. Another time consuming method is to hand weld hex metal to the metal object before the lining material is applied.

BRIEF SUMMARY OF THE INVENTION

Accordingly it is an object of the present invention to provide for a method of mounting anchoring assemblies to a metal object for anchoring a liner of a cured lining material arranged to be applied in liquid form to the metal object in a faster, less time consuming manner compared to known methods.

Accordingly, it is a further object of the present invention to provide for an anchoring assembly which is arranged to be mounted to the metal object in a faster, less time consuming manner compared to known anchoring assemblies.

In order to accomplish that object, the invention, according to a first aspect thereof, provides for a method of mounting anchoring assemblies to a metal object for anchoring a liner of a cured lining material arranged to be applied in liquid form to the metal object, the method including the steps of: placing an anchoring assembly template, for example a stencil, at the metal object, the template comprising a plurality of anchoring assembly cut outs indicating positions of the anchoring assemblies relatively to each other; applying a marking agent to the anchoring assembly template marking the metal object by marked positions corresponding to the plurality of anchoring assembly cut outs; and mounting the anchoring assemblies to the metal object corresponding to the marked locations at the metal object.

The invention is based on the perception that the time required for the mounting process of the anchoring assembly may be reduced in case the plurality of spaced anchor fins are pre-connected to the elongated mounting pin at a second end, before the mounting process takes place. As such, the elongated mounting pin having the plurality of spaced anchor fins are mounted as a whole to the metal object.

The inventors noted that in order to decrease the time needed for mounting the anchor assemblies to the metal object, the metal object may be provided with markings for indicating the positions of each of the anchor assemblies to be mounted on the metal object. By using an anchoring assembly template having cut outs corresponding to the plurality of anchoring assemblies to be mounted, a person is able to mark the metal object for that plurality of anchoring assemblies at once. A person is able to, for example, mark 50, 100 or 150 positions of anchoring assemblies at the metal object at one time. This saves time as in prior situations, each anchoring assembly was marked one at a time.

In an example of the invention, the anchoring assembly template comprises evenly distributed anchoring assembly cut outs such that the anchoring assemblies are mounted at the metal object evenly distributed.

The advantage of this example is that the load the anchoring assemblies are able to transfer to the cured lining material is evenly distributed. In other words, the bonding of the anchor fins of the anchoring assemblies with the cured lining material is evenly distributed.

In another example, the anchoring assembly cut, outs correspond to a circumferential edge of the anchoring assemblies, respectively.

This example is advantageous as a person responsible for mounting the anchoring assemblies to the metal object is able to clearly see where the anchoring assemblies should be mounted. The person will try to fit each anchoring assembly within the circumferential edge of the marking applied to the metal object.

In a further example, the anchoring assembly cut outs indicate positions and orientations of anchoring fins of the anchoring assemblies relatively to each other.

The inventors noted that during cleaning of the surface, i.e. preparing the metal object for welding, the markings already applied to the metal object may be lost. As such, it is most likely that the markings corresponding to the spaced anchor fins of the anchoring assemblies are not, or hardly, affected by the cleaning process, such that these markings are, most likely, still visible for the person responsible for mounting the anchoring assemblies.

In another embodiment, applying the marking agent comprises any of spraying a marking spay and applying a marking paint to the anchoring assembly template marking the metal object by the marked positions.

In a further embodiment, the method further includes the step of preparing at least the marked locations at the metal object for mounting the anchoring assemblies thereto.

The above mentioned step may be performed any time during the mounting process, for example after or before the marking agent is applied to the metal object.

Preparing the at least marked locations at the metal object for mounting the anchoring assemblies means, for example, that the metal object is ground, sand blasted or the like, such that the metal object is fit for welding the elongated mounting pin thereto.

In a second aspect of the invention, there is provided an anchoring assembly template for use in mounting anchoring assemblies to a metal object for anchoring a liner of a cured lining material arranged to be applied in liquid form to the metal object, the anchoring assembly template including a plurality of anchoring assembly cut outs indicating positions and orientations of the anchoring assemblies relative to each other.

Here, the anchoring assembly cut outs may be evenly distributed such that the anchoring assemblies are mounted at the metal object evenly distributed.

The anchoring assembly cut outs may further correspond to a circumferential edge of the anchoring assemblies, respectively.

In an example, the anchoring assembly cut outs indicate positions and orientations of anchoring fins of the anchoring assemblies relatively to each other.

In an example, the present application provides for an anchoring assembly for anchoring a liner of a cured lining material arranged to be applied in liquid form to a metal object provided with the anchoring assembly, the anchoring assembly comprising an elongated mounting pin and a ferrule provided at a first end of the elongated mounting pin, wherein the elongated mounting pin is arranged to be mounted, at the first end, to the metal object using the ferrule, the anchoring assembly further comprises a plurality of spaced anchor fins, wherein the plurality of spaced anchors fins are connected to the elongated mounting pin at a second end and extend radially outwardly with respect to the elongated mounting pin, The ferrule includes a radially outwardly extending place holder part arranged to be held by a ferrule holder during mounting of the elongated mounting pin, at the first end, to the metal object.

A ferrule is used to hold the mounting residue, i.e. welding residue, at his place during the mounting process, i.e. stud welding process. The inventors noted that a ferrule comprising a radially outwardly extending place holder part is beneficial as this provides the possibility for holding the ferrule at his place during the mounting process and for removing the ferrule holder after the mounting process. Further, it provides for space at the other side of the anchoring assembly such that it is possible to mount anchoring assemblies in smaller spaces at the metal object.

The invention is based on the perception that the time required for the mounting process of the anchoring assembly may be reduced in case the plurality of spaced anchors fins are connected to the elongated mounting pin at a second end and extend radially outwardly with respect to the elongated mounting pin, before the mounting process takes place. As such, only the elongated mounting pin needs to be mounted to the metal object in situ, i.e. at the building or construction site.

The inventors noted that in such a case, the ferrule should comprise a radially outwardly extending place holder part arranged to be held by a ferrule holder during mounting of the elongated mounting pin, at the first end, to the metal object. Such a radially outwardly extending place holder has the beneficial effect that the ferrule holder is able to hold the ferrule, and align it with the rest of the anchoring assembly, during the mounting process. The rest of the anchoring assembly, for example the spaced anchor fins, may be held by a chuck such that the complete anchoring assembly is kept in its place during the mounting process.

A further advantage is that, due to the radially outwardly extending place holder part, the anchoring assembly required less space around it during the welding process, and it can therefore be welded in much tighter spaces.

In accordance with the present invention, extending radially outwardly with respect to the elongated mounting pin means, in an example, that the spaced anchor fins are oriented substantially parallel to the metal object when the anchoring assembly is mounted on the metal object. As such, the spaced anchor fins are oriented transversely compared to the elongated direction of the mounting pin.

The anchor fins may be spaced relative to each other which means that the individual anchor fins are not directly interconnected. In an example of the invention, the anchor fins are indirectly connected to each other via a nut which is connectable to the elongated mounting pin.

In a practical example of the present invention, applying lining material in liquid form to a metal object comprises pouring and/or ramming concrete onto the metal object having mounted thereto an anchoring assembly.

In an embodiment of the present invention, the place holder part extends radially outwardly between two of the plurality of radially outwardly extending spaced anchor fins.

The above provides additional room or space for the ferrule holder to hold the radially outwardly extending place holder part. As such, the radially outwardly extending spaced anchor fins do not form an obstacle for the ferrule holder to engage on the radially outwardly extending place holder part.

In another embodiment, the two radially outwardly extending spaced anchor fins define a central angle, and wherein a centre axis of the radially outwardly extending place holder part substantially coincides with a mirror axis of the central angle.

The inventors noted that the most room or space is available in case the radially outwardly extending place holder part is oriented substantially in the middle of two subsequent anchor fins.

In the context of the present invention, a central angle is an angle whose apex is the centre of a circle, i.e. the centre is conceptually equal to the elongated mounting pin and the circle is spanned by the ends of the spaced anchor fins, and whose legs, i.e. the spaced anchor fins, are radii intersecting the circle in two distinct points thereby subtending an arc between those two points whose angle is equal to that of the central angle itself. It is also known as the arc segment's angular distance.

The centre axis of the radially outwardly extending place holder part should then substantially be in line with the mirror axis of the above defined central angle. The mirror axis is defined as the axis of the middle of the central angle, originating from the elongated mounting pin.

In an embodiment of the invention, the ferrule is made of a material comprising any of ceramic, metal, plastic.

In a further embodiment, the ferrule comprises a plurality of recesses at a side which is to be mounted to the metal object such that a plurality of spaces are provided for venting air pushed out during the mounting process of stud welding the elongated mounting pin to the metal object.

In another embodiment the ferrule does not comprise one or more recesses at the side of the ferrule having the radially outwardly extending place holder part. The advantage hereof is that the anchoring assembly may be mounted to a metal object which is vertically oriented. Due to gravity, mounting residual, for example welding residual, may drip and fall down. In case no recesses are available at the side of the ferrule having the radially outwardly extending place holder part, no mounting residual, i.e. welding residual, is able to drip downwards.

As such, these so called bottom recesses are omitted to avoid any molten material during the welding process to drip down out of the ferrule due to gravity.

In an embodiment of the present invention, the anchoring assembly comprises three spaced anchor fins.

The inventors noted that in case the anchoring assembly comprises three spaced anchor fins, there is sufficient space between two of these spaced anchor fins for the radially outwardly extending place holder part to be held by a ferrule holder.

In another example, the radially outwardly extending place holder part comprises a raised rim to which the ferrule holder can engage for holding the place holder.

The shape of the raised rim may be any of rectangular, square, triangular, pentagonal, hexagonal, circular or the like.

The advantage of a ferrule having a rim is that the ferrule holder may be adapted with, for example, a notch or recess or the like which matches with the rim, such that the ferrule holder is able to securely hold the ferrule, and thus also the elongated mounting pin having the spaced anchor fins, in place.

As such, the radially outwardly extending place holder part may form a mating connector for a ferrule holder part of the ferrule holder.

In a further embodiment of the present invention, the anchoring assembly further comprises a nut, wherein the plurality of spaced anchor fins are welded or soldered to the nut, and wherein the nut is mounted on the elongated mounting pin at the second end.

The nut having the plurality of spaced anchor fins may also be a comprised by a single component by e.g. casted using a mold or die.

The nut may further be fixed to the elongated mounting pin at the second end, i.e. using a press force, or soldered, welded, or the like.

One of the advantages of the present invention is that the nut may be securely fastened to the mounting pin before the mounting pin is mounted onto the metal object. The nut may, for example, be screwed on top of the mounting pin, and may further be fixated to the elongated mounting pin such that the nut is permanently fastened to the elongated mounting pin. The above does not need to take place in situ, i.e. on the building site. Elongated mounting pins having the nut securely fastened thereto may be manufactured beforehand, such that the mounting process of mounting the anchoring assemblies onto the metal object is made less time consuming.

In a further embodiment of the present invention, the spaced anchor fins are tangentially evenly distributed around the elongated mounting pin.

In an even further embodiment of the present invention, the place holder is having a width perpendicular to the radially outwardly extending direction, wherein the width is substantially smaller than a diameter of the elongated mounting pin.

The advantage of the above provided embodiment is that a large part of the circumferential edge is not occupied by the radially outwardly extending place holder part, providing room or space along that large part of the circumferential edge such that along that part the elongated mounting pin may be mounted to the metal object, for example by a welding process.

In another embodiment, the place holder is having a length in line with the radially outwardly extending direction, wherein the length is substantially equal to a length of the radially outwardly extending spaced anchor fins.

In accordance with the present invention, another type of anchoring assembly may also be used in conjunction with a ferrule. This type, of anchoring assembly is especially useful for anchoring a liner having thickness of about 30 mm-80 mm, preferably around 50 mm.

As such, it is an anchoring assembly for anchoring a liner of a cured lining material applied in liquid form to a metal object provided with said anchoring assembly, said anchoring assembly including an elongated mounting pin, which elongated mounting pin is arranged to be mounted, at a first end, to said metal object, and a plurality of spaced anchor fins, wherein said plurality of spaced anchors fins are connected to said elongated mounting pin at a second end and extend radially outwardly with respect to said elongated mounting pin, and wherein said spaced anchor fins are plate shaped having a first side and a second side opposite to said first side, for example a top side and a bottom side, wherein each anchor fin comprises at least two recesses and at least two protrusions, wherein a first of each of said at least two protrusions extends from a first side of a corresponding anchor fin and wherein a second of each of said at least two protrusions extends from a second side of said corresponding anchor fin.

This type of anchoring assembly is based on the perception that the total load an individual anchoring assembly is able to transfer to the cured lining material is increased in case the anchoring assembly is provided with a plurality of spaced anchor fins extending radially outwardly with respect to the elongated mounting pin, and wherein the length of the anchoring assembly is adjusted to the expected thickness of the cured lining material.

By having a first of each of said at least two protrusions extends from a first side of a corresponding anchor fin and a second of each of said at least two protrusions extends from a second side of said corresponding anchor fin, the total load the anchoring assembly is able to transfer is increased.

In an example, each of said at least two protrusions are connected to their corresponding anchor fin at one of said at least two recesses.

This means that close to, or at, each recess present in an anchor fin, a protrusion is present.

Each anchor fin may include two protrusions, wherein these two protrusions are oriented, placed, adjacently to each other in elongated direction. As such, when the anchoring assembly is placed on top of the metal object, the protrusions are oriented on top of each other, i.e. above each other. The same may be said for the recesses of each of the anchor fins.

The protrusions preferably extend tangentially with respect to the mounting pin, i.e. in circumferential direction of the mounting pin.

For example, a length of said assembly is between 3 cm and 8 cm, preferably between 4.5 cm and 5.5 cm.

In an example, each of said plurality of spaced anchor fins extend to above said mounting pin, in elongated direction. The anchor fins may be connected to each other above said elongated mounting pin.

In an example there is provided a ferrule suitable for use with an anchoring assembly according to the present invention, wherein the ferrule is arranged to be mounted at the first end of the elongated mounting pin, wherein the ferrule comprises a radially outwardly extending place holder arranged to be held by a ferrule holder during Mounting of the elongated mounting pin, at the first end, to the metal object.

The expressions, i.e. the wording, of the different aspects comprised by the anchoring assembly, the ferrule and the anchoring mounting assembly according to the present invention should not be taken literally. The wording of the aspects is merely chosen to accurately express the rationale behind the actual function of the aspects.

In accordance with the present invention, different aspects applicable to the above mentioned examples of the anchoring assembly, including the advantages thereof, correspond to the aspects which are application to the ferrule as well as the anchoring mounting assembly according to the present invention.

In an embodiment thereof, the radially outwardly extending place holder part comprises a raised rim to which the ferrule holder can engage for holding the place holder.

The shape of the raised rim may be any of rectangular, square, triangular, pentagonal, hexagonal and circular.

The advantage of the radially outwardly extending place holder part having a raised rim, is that a ferrule holder may be designed with a ferrule holder part matching that raised rim, i.e. the ferrule holder part may be considered as a mating connector for the radially outwardly extending place holder part having the raised rim.

In another embodiment, the place holder is having a width perpendicular to the radially outwardly extending direction, wherein the width is substantially smaller than a diameter of the elongated mounting pin.

In an example, there is provided an anchoring mounting assembly including an anchoring assembly according to any of the embodiments of the above mentioned anchoring assembly, the anchoring mounting assembly further including a ferrule holder arranged for holding the ferrule at the radially outwardly extending place holder part during mounting of the elongated mounting pin, at the first end, to the metal object.

In an embodiment thereof, the ferrule holder comprises a ferrule holder part arranged for mating with the radially outwardly extending place holder part.

In an example, there is provided for a use of an anchoring assembly according to any of its embodiments as explained above, for anchoring a liner of a cured lining material arranged to be applied in liquid form to a metal object provided with the anchoring assembly.

In an example, the invention provides for an anchoring assembly for anchoring a liner of a cured lining material arranged to be applied in liquid form to a metal object provided with the anchoring assembly, the anchoring assembly comprising an elongated mounting pin and a ferrule provided at a first end of the elongated mounting pin, wherein the elongated mounting pin is arranged to be mounted, at the first end, to the metal object, the anchoring assembly further comprises a plurality of spaced anchor fins, wherein the plurality of spaced anchors fins are connected to the elongated mounting pin at a second end and extend radially outwardly with respect to the elongated mounting pin, wherein at least one of the plurality of spaced anchor fins comprise a through hole.

In an embodiment thereof, the through hole is being surrounded by a circumferential edge, from which edge a tab extends under an angle from the at least one spaced anchor fin.

In a further embodiment, the tab extends tangentially with respect to the elongated mounting pin.

BRIEF DESCRIPTION OF THE DRAWINGS

The invention will now be explained in more detail with reference to the appended figures, which merely serve by way of illustration of the invention and which must not be construed as being limitative thereto.

DETAILED DESCRIPTION OF THE INVENTION

Figure 1:
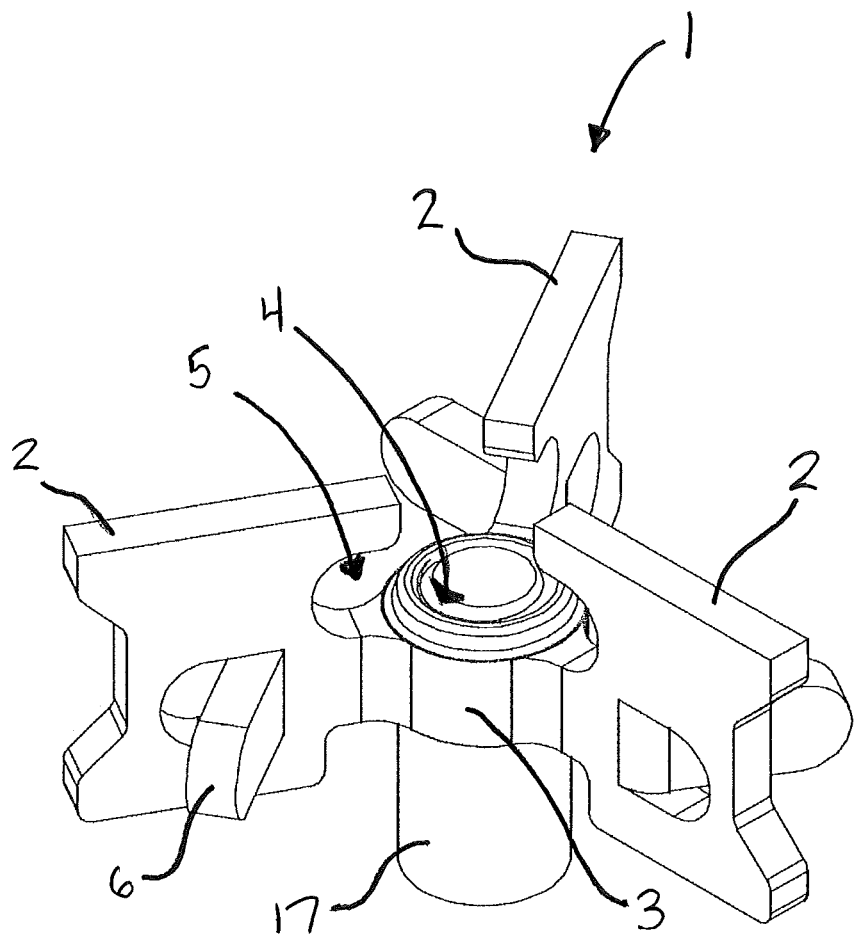
FIG. 1 shows, in a schematic form, an embodiment of an anchoring nut fixated to the mounting pin according to the present invention.

FIG. 1 shows, in a schematic form, a side view 1 of an embodiment of an anchoring nut fixated to a mounting pin according to the present invention.

The anchoring nut 3 comprises a plurality of spaced anchor fins 2 extending radially outwardly from the anchoring nut 3. In the present example, the anchoring nut 3 is provided with a screw thread 4 for screwing the nut 3 onto an elongated mounting pin 17 which mounting pin 17 is to be attached to a metal object.

In the context of the present invention, the wording spaced means that the anchor fins 2 are each separately identifiable, i.e. each individual fin 2 is directly connected to either the elongated mounting pin or the anchoring nut 3.

As is clear from FIG. 1 of the anchoring nut 3, the spaced anchor fins 2 are tangentially evenly distributed around the anchoring nut 3. This means that the (tangential) distance between the separate anchor fins 2 are substantially equal.

In the present example, the top side of the spaced anchor fins 2 are aligned, such that the cured lining material applied in liquid form to a metal object provided with an elongated mounting pin having the anchoring nut mounted thereon, is levelled with the cured lining material. The inventors noted that in case the topside of the spaced anchor fins are not aligned, the cured lining material may chip and cause holes.

Further, the side 5 of the spaced anchor fins 2 at which the spaced anchor fins 2 are connected to the elongated mounting pin is tapered, such that the probability that the cured lining material present above the anchoring nut 3 and the spaced anchor fins 2 to spall and pop out is reduced.

The largest diameter of the anchoring nut 3, in the present example, is 30 millimeter, providing easy transportation and installation of the nut 3.

In order to increase the capability for withholding a larger load, a cut out part 6 of the spaced fins 2 is extended for providing additional strength to the anchoring assembly.

Figure 2:
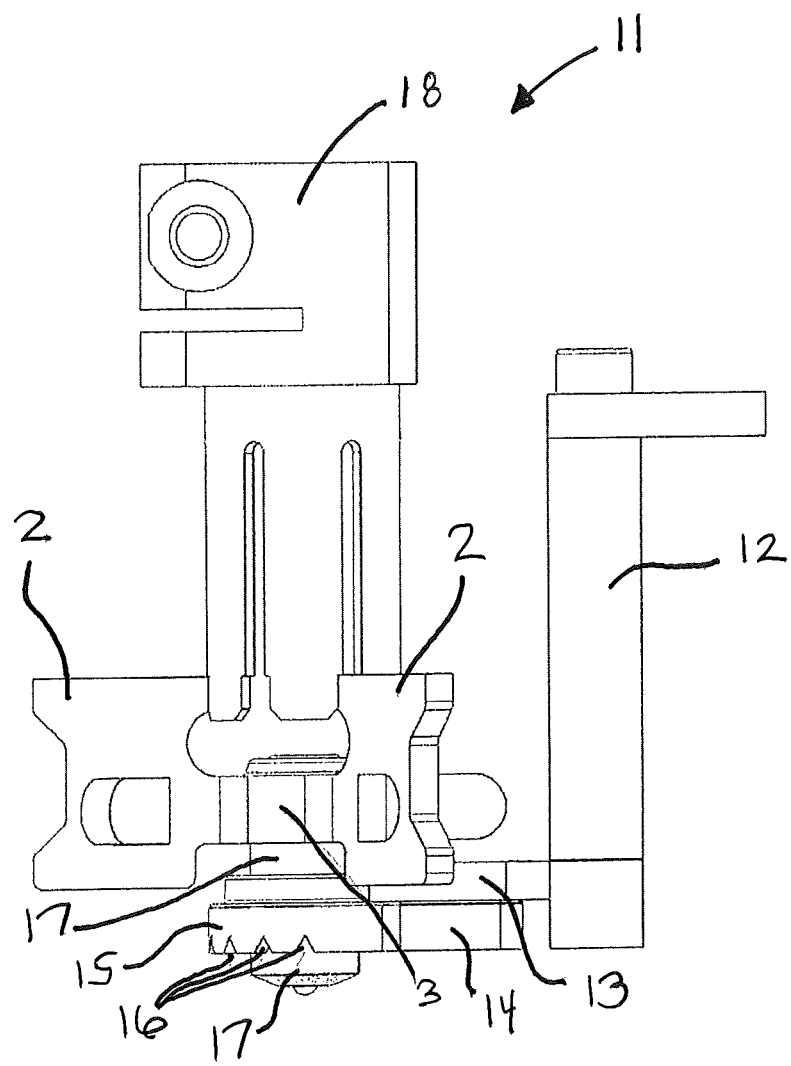
FIG. 2 shows, in a schematic form, a anchoring mounting assembly according to an embodiment of the present invention.

FIG. 2 shows, in a schematic form, a anchoring mounting assembly 11 according to an embodiment of the present invention.

The anchoring mounting assembly 11 comprises an anchoring assembly, wherein the anchoring assembly comprises the nut 3, the elongated mounting pin 17 and the ferrule 15. According to the present invention, an anchoring mounting assembly 11 thus comprises an anchoring assembly, the ferrule holder 12 and the chuck.

Here, the nut 3 having the spaced anchor fins 2 is screwed on top of the elongated mounting pin 17. Once the nut 3 is in place, it is further fixated, for example welded or pressurized, to the elongated mounting pin 17 to make sure that the connection is rigid, or permanent. The above mentioned process may be performed before the elongated mounting pin 17 with the nut 3 welded thereto is provided to the building site. This reduces any valuable time at the building site.

The assembly further comprises a ferrule 15, which is arranged to be held by the ferrule holder. Once the anchoring mounting assembly is in place, a person is able to weld the elongated mounting pin to the metal object (not shown).

Mounting the elongated pin to the metal object is than performed by stud welding the elongated mounting pin. The ferrule is then arranged for maintaining or holding the spot welding residual, for example melted metal, at his place. The recesses 16 of the ferrule are arranged for venting air pushed out during the welding process.

The ferrule 15 comprises radially outwardly extending place holder 14 arranged to be hold by a ferrule holder 12 during mounting of the elongated mounting pin 17, at the first end, to the metal object.

Here, the ferrule holder 12 comprises a ferrule holder part 13 arranged for mating with the radially outwardly extending place holder part 14.

The place holder part 14 extends radially outwardly between two of the plurality of radially outwardly extending spaced anchor fins 2, wherein the two radially outwardly extending spaced anchor fins define a central angle, and wherein a centre axis of the radially outwardly extending place holder part substantially coincides with a mirror axis of the central angle.

The anchoring mounting assembly 11 further comprises a chuck 18 for positioning, and holding, the nut 3 having the spaced anchor fins 2 during the welding process.

Figure 3:
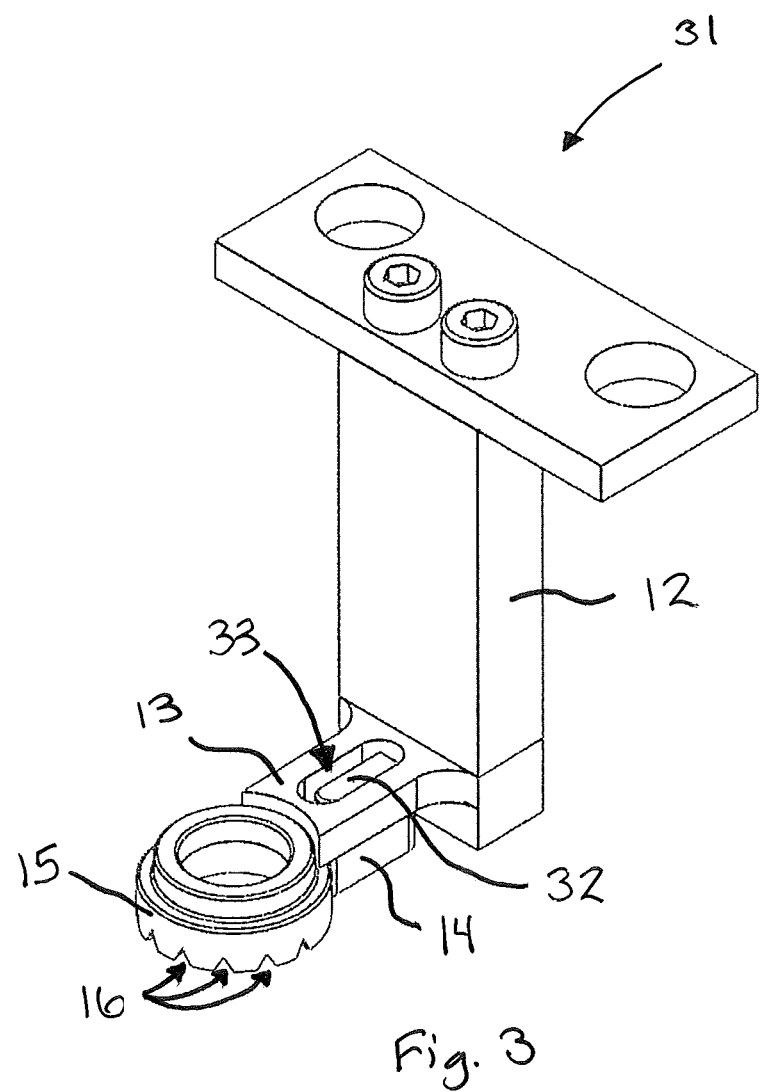
FIG. 3 shows, in a schematic form, an example of a part of an anchoring mounting assembly according to an embodiment of the present invention.

FIG. 3 shows, in a schematic form, an example of a part 31 of an anchoring mounting assembly according to an embodiment of the present invention. FIG. 3 shows the ferrule holder 12 having a ferrule holder part 13 arranged for mating with the radially outwardly extending place holder part 14.

As shown, the radially outwardly extending place holder part 14 comprises a rim 32, in the particular example having a rectangular shape, which rim is suitable to fit into the opening 33 provided in the ferrule holder part 13.

As mentioned before the shape of the rim 32, and thus also the shape of the opening 33, may be any of circular, rectangular, triangular, pentagonal, hexagonal.

Figure 4:
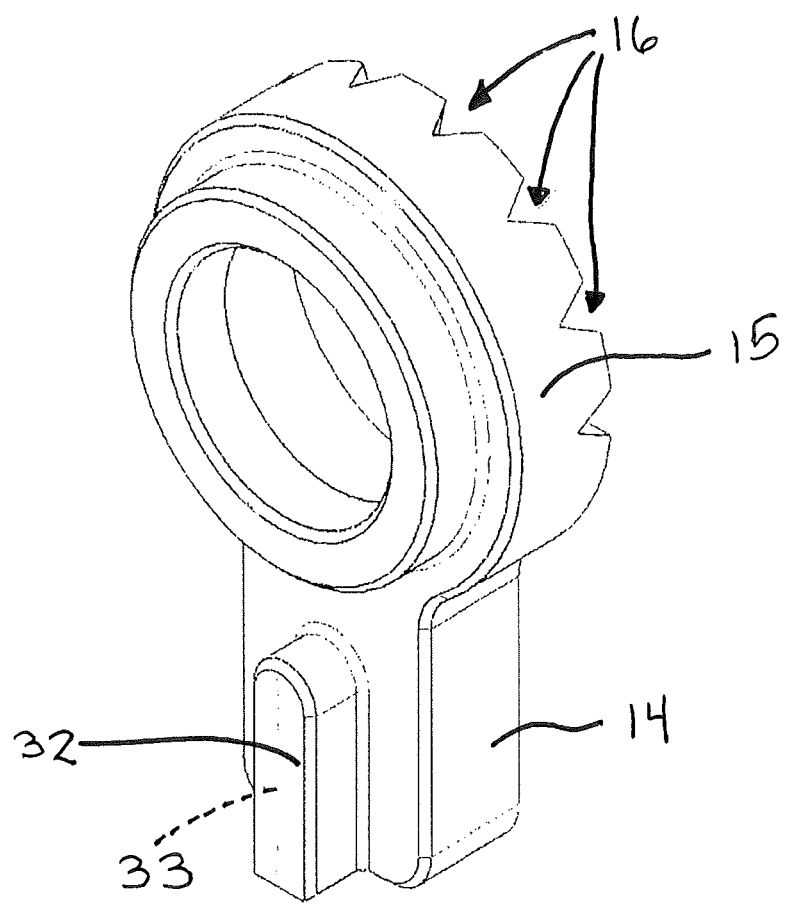
FIG. 4 shows, in a schematic form, an example of a ferrule to be used with an anchoring assembly according to the present invention.

FIG. 4 shows, in a schematic form, an example of a ferrule 14 to be used with an anchoring assembly according to the present invention.

The ferrule 14 is suitable for use with an anchoring assembly according to the present invention, wherein the ferrule is arranged to be mounted at the first end of the elongated mounting pin, wherein the ferrule comprises a radially outwardly extending place holder 14 arranged to be hold by a ferrule holder during mounting of the elongated mounting pin, at the first end, to the metal object.

As the before, two radially outwardly extending spaced anchor fins may define a central angle, and wherein a centre axis of the radially outwardly extending place holder part 14 substantially coincides with a mirror axis of the central angle.

Figure 5:
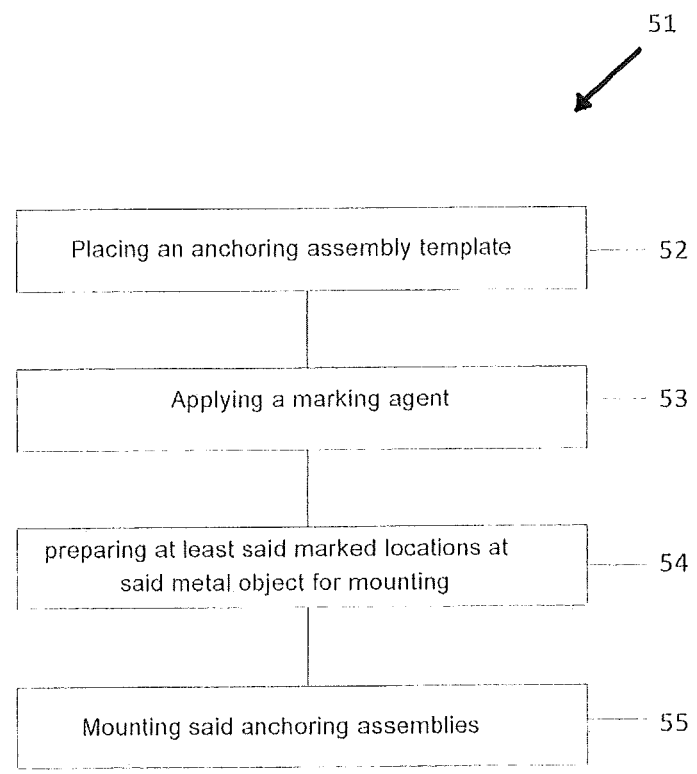
FIG. 5 shows, in a schematic form, an example of a flow chart illustrating a method according to the present invention.

FIG. 5 shows, in a schematic form, an example of a flow chart 51 illustrating a method according to the present invention.

FIG. 5 displays a method of mounting anchoring assemblies to a metal object for anchoring a liner of a cured lining material arranged to be applied in liquid form to the metal object, the method including the steps of: placing 52 an anchoring assembly template at the metal object, the template comprising a plurality of anchoring assembly cut outs indicating positions of the anchoring assemblies relatively to each other; applying 53 a marking agent to the anchoring assembly template marking the metal object by marked positions corresponding to the plurality of anchoring assembly cut outs; preparing 54 at least the marked locations at the metal object for mounting the anchoring assemblies thereto; and mounting 55 the anchoring assemblies to the metal object corresponding to the marked locations at the metal object.

Figure 6:
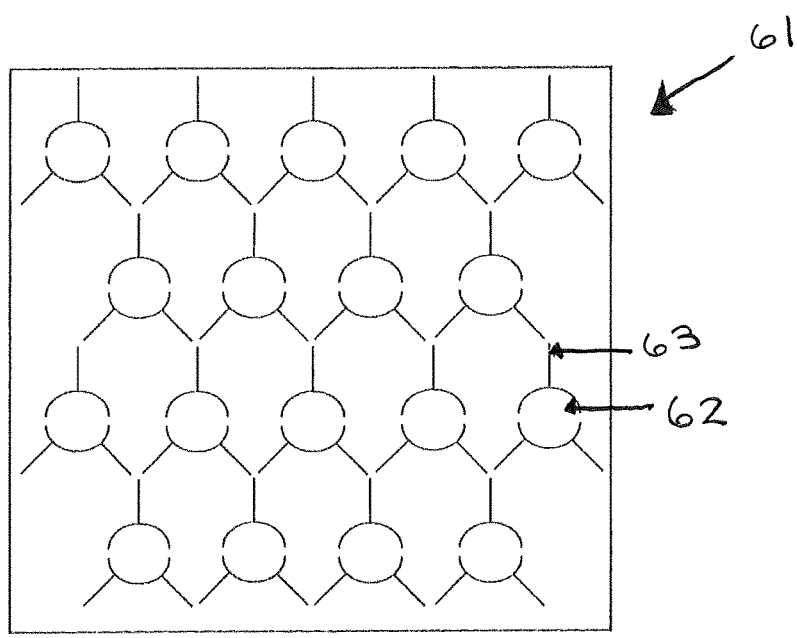
FIG. 6 shows, in a schematic form, an example of an anchoring assembly template according to the present invention.

FIG. 6 shows, in a schematic form, an example of an anchoring assembly template according to the present invention.

FIG. 6 displays an anchoring assembly template 61 for use in mounting anchoring assemblies to a metal object for anchoring a liner of a cured lining material arranged to be applied in liquid form to the metal object, the anchoring assembly template including a plurality of anchoring assembly cut outs 63 (only 1 is shown) indicating positions and orientations of the anchoring assemblies 61 relative to each other.

In an ideal situation, the ferrule should be fitted inside the circle marked with reference numeral 62.

The present invention has been explained in the foregoing by means of a number of examples. As those skilled in the art will appreciate, several modifications and additions can be realised without departing from the scope of the invention as defined in the appended claims.

What is claimed is:

1. An anchoring assembly comprising an elongated mounting pin and a ferrule provided at a first end of the elongated mounting pin, wherein the elongated mounting pin is arranged to be mounted by a welding process at the first end to a metal object, the anchoring assembly further comprising a plurality of spaced anchor fins connected to the elongated mounting pin at a second end and extending radially outwardly relative to the elongated mounting pin, wherein the ferrule has an enclosed or partially enclosed cylindrical shape that is configured to contain mounting residue within the ferrule during the welding process, the ferrule comprising a radially outwardly extending place holder part having a protrusion arranged thereon that is removably received within a ferrule holder during the welding process of the elongated mounting pin at the first end to the metal object, the ferrule holder being removable after concluding the welding process.

2. The anchoring assembly according to claim 1, wherein the ferrule comprises a plurality of recesses on a side thereof to be mounted to the metal object such that a plurality of spaces are provided for venting air pushed out during mounting.

3. The anchoring assembly according to claim 1, wherein the radially outwardly extending place holder part comprises a raised rim to which the ferrule holder can engage for holding the place holder, wherein a shape of the raised rim is one of rectangular, square, triangular, pentagonal, hexagonal and circular.

4. The anchoring assembly according to claim 1, wherein the place holder outwardly extends from the ferrule, wherein a width of the placeholder is smaller than a diameter of the elongated mounting pin.

5. The anchoring assembly according to claim 1, wherein the place holder has a length aligned with the ferrule, wherein the length is equal to a length of the radially outwardly extending spaced anchor fins.

6. The anchoring assembly according to claim 1, wherein the spaced anchor fins are plate shaped and have a first side and a second side opposite the first side, wherein each anchor fin comprises at least two recesses and at least two protrusions, wherein a first of each of the at least two protrusions extends from the first side of a corresponding anchor fin and wherein a second of each of the at least two protrusions extends from the second side of the corresponding anchor fin.

7. The anchoring assembly according to claim 6, wherein each of the at least two protrusions are connected to their corresponding anchor fin proximate to one of the at least two recesses.

8. The anchoring assembly according to claim 7, wherein each of the at least two protrusions are positioned adjacent to each other in an elongated direction.

* * * * *